Patented May 18, 1948

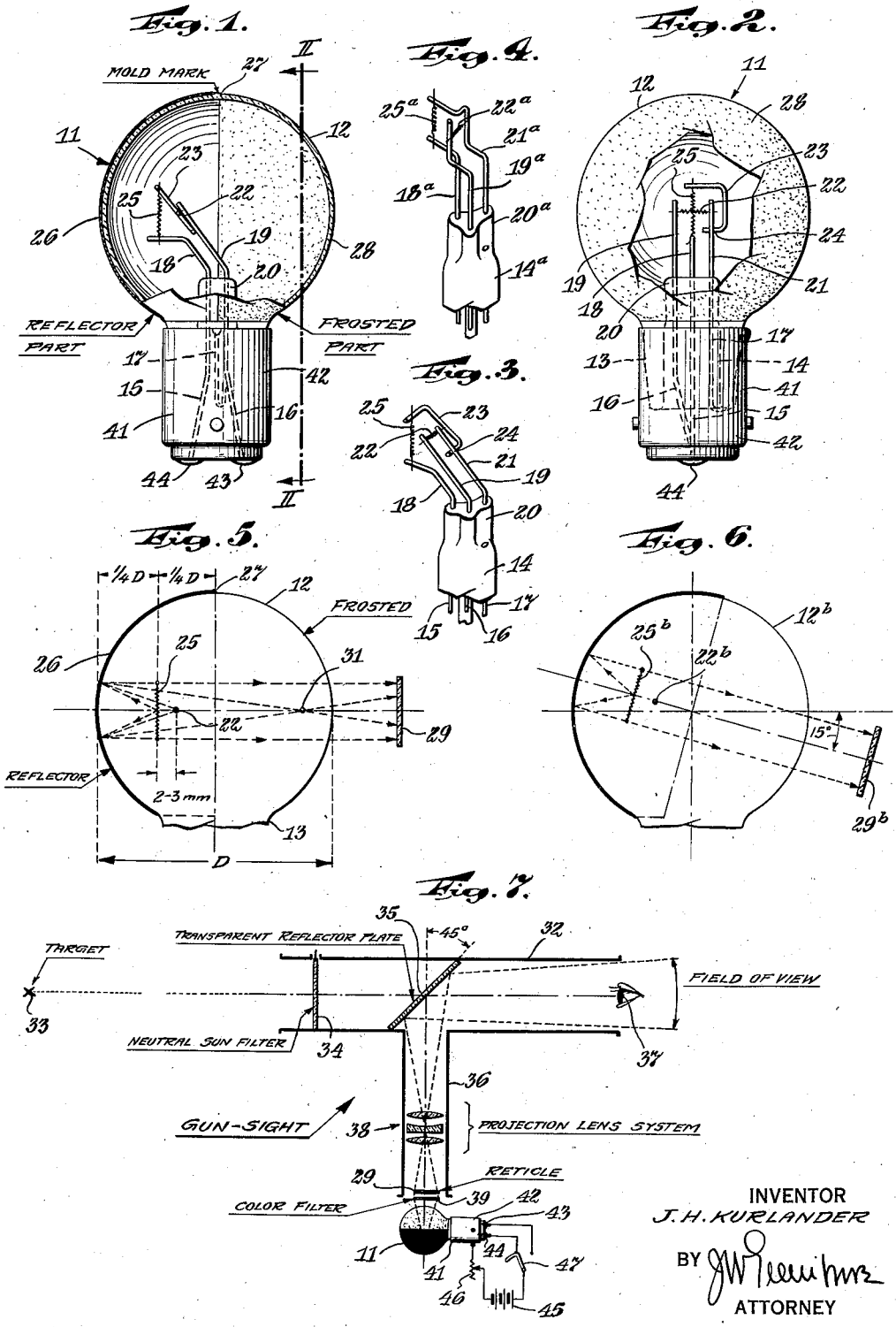

2,441,823

UNITED STATES PATENT OFFICE 2,441,823

REFLECTOR LAMP AND OPTICAL SYSTEM

John H. Kurlander, Nutley, N. J., assignor to Westinghouse Electric Corporation, East Pittsburgh, Pa., a corporation of Pennsylvania Application February 1, 1943, Serial No. 474,372

15 Claims. (Cl. 176—34)

This invention relates to optical systems and, more particularly, to a reflector lamp for illuminating the reticle used in an optical system for gun sights and the like.

The principle object of my invention, generally considered, is to produce a lamp particularly adapted for illuminating a reticle used in such optical systems as those for gun sights, whereby a vast increase in illumination is provided, so as to make it possible to see the reticle sight lines even when looking against the sun without, however, increasing the power of lamp and the corresponding heat developed.

Another object of my invention is to increase the intensity of illumination for reticle sight lines from eight to thirty times those in general use, in order to overcome the difficulties now encountered when it is necessary to sight a gun directly at the sun.

A further object of my invention is the provision of a lamp involving a self-contained optical system collecting light over a wide angle and projecting it in one direction like a miniature search light.

A still further object of my invention is the provision of an optical-type lamp particularly adapted for illuminating gun sights, employing conventional or standard parts, half silvered or coated with a specular material, desirably half frosted, and adapted to be controlled, as by a series resistance in its power circuit, in accordance with conditions under which it is used.

Other objects and advantages of the invention, relating to the particular arrangement and construction of the various parts, will become apparent as the description proceeds.

Referring to the drawing:

Fig. 1 is a side elevational view, with a portion of the bulb broken away, of a lamp embodying my invention.

Fig. 2 is an elevational view of the lamp of Fig. 1 on the line II—II thereof and in the direction of the arrows, a portion of the bulb being broken away to show the interior construction.

Fig. 3 is a perspective view of the mount of the lamp of Figs. 1 and 2.

Fig. 4 is a perspective view corresponding to Fig. 3, but showing another embodiment of my invention.

Fig. 5 is a diagrammatic view of the bulb and filaments therein, showing the lines of reflection therebetween.

Fig. 6 is a view corresponding to Fig. 5, but showing a modification.

Fig. 7 is a partly diagrammatic view of an optical system using a lamp embodying my invention.

In certain gun sights of the so-called "reflex" or reflector type used by the Army and Navy air forces, a reticle on which the sight lines are inscribed is placed at the focal point of a compound projecting lens system, so that a real image of the reticle sight lines is projected into the field of view of the gunner. If a light source is placed immediately behind the reticle will be visible when an observer's eye is placed anywhere within the marginal limits of the image beam projected by the lens system.

The projected image beam is for the stated purpose reflected at right angles, as by means of a transparent glass plate having parallel surfaces and placed at an angle of 45° to said beam, so that the axis of the reflected beam coincides with the axis of the aiming sight lines between the gunner's eye and the target. A gunner looking through the telescope tube will, therefore, see the target (generally an airplane), delineated within the field of the sight against the bright field of the sun, sky or clouds. Superimposed on the target will be the image of the illuminated reticle. The attacking plane or a ground-stationed anti-aircraft gun, for example, is then maneuvered until it lines up with the sighting reticle image.

When the brightness of the field against which the target is delineated is low, as at dawn, dusk, or when the sky is heavily overcast, the problem of illuminating the reticle brightly enough to render it clearly visible is not difficult, and for such cases standard forms of incandescent lamps having all frosted bulbs are available. In such lamps frosting of the bulb is required to provide an even illumination over the surface of the reticle.

It is common practice for the pilots of attacking planes to operate with the sun at their backs so that the defending gunner will be blinded by the sun's glare. A neutral filter is used to reduce the sun's brightness, with consequent reduction in the target's visibility. Even so, the brightness of the sky surrounding the sun is so much greater than that of the illuminated reticle, that the image of the latter is washed out and the defending gunner left virtually helpless.

Common forms of incandescent lamps as now used cannot cope with this condition, so that there is a vital need of a high efficiency form of optical lamp for use in all types of "reflex" gun sights. My invention has been made to remedy this condition and makes use of the image forming properties of a smooth spherical concave reflecting surface. One of the important properties of such a surface is that it can be made to project a light beam of varying diameter, depending upon the location of the light source with respect thereto. Thus if the light source or filament is placed at the center of curvature of the spherical surface, an inverted image of the filament will be projected back on top of said filament. The spherical surface has a focal length equal to one-half the radius of curvature, when approximating a parabolic surface for projecting parallel light rays. If the filament is placed at said focal point, the image will be approximately projected to infinity and the combination serves as a form of searchlight projector.

For positions of the filament between the focal point and the center of curvature, the image will be formed somewhere between infinity and the center of curvature. The location of said image can, therefore, be accurately controlled by positioning the image between the focal point and the center of curvature.

The filament is positioned so that the projected beam of light is big enough to cover the reticle. The size of the reticle, of course, will determine not only the filament position but also, to a certain extent, the radius of curvature of the spherical surface. At any rate the operating limits of the system are sufficient to take care of the reticle sizes as now used.

It is desirable in lamps used in "reflex" sights to have a second filament for standby service or to provide a low intensity of reticle illumination to meet conditions of low sky brightness, or to give some variation in the point of focus of the beam of light. If only low intensity is required of the second or minor filament its candle power and positioning are of secondary importance. Nevertheless with the type of lamp proposed it is possible, if necessary, to have both filaments serve as majors so that virtually optimum illumination can be obtained from either and both can be used simultaneously for tropical combat where the sky brightness reaches its maximum.

Referring now to the drawing in detail, like parts being designated by like reference characters, and first considering the embodiment illustrated in Figs. 1 to 3, inclusive, there is shown an incandescent lamp 11 having a spherical bulb 12, of the type generally designated by the Westinghouse Electric & Manufacturing Company as G9, which has an outside diameter of approximately one and one-eighth inches. A bulb of such a size is shown because it fits present equipment. However, I do not wish to be so limited as the bulb may be of any suitable size. Said bulb has a generally cylindrical neck portion 13 projecting therefrom and closed by a flare tube 14 which, in the present embodiment, has three leads, 15, 16 and 17 connecting, respectively, with the filament supports 18, 19 and 21 extending from the press 20. The filament supports 19 and 21 hold the minor or second filament 22 in a normally horizontally position between their free ends, while the support 18 and an extension 23 welded to the support 21, as at 24, holds the major filament 25 in a normally vertical position.

Inasmuch as it is desirable to have the flare tube 14 extend axially of the bulb 12 and neck 13 thereof, supports 18, 19 and 21 are desirably bent, as shown most clearly in Figs. 1 and 3, so that the major filament 25 is disposed midway between an axial plane of the bulb and neck and the center 26 of the reflecting surface provided on the exterior or interior of said bulb, and desirably covering one-half the area thereof as shown most clearly in Fig. 1. This coating may be of aluminum, silver, gold, or other specular material. If a colored material such as gold is used, selective reflection will occur, possibly making it unnecessary to have a color filter to use therewith to make the reticle image contrast with the background.

For ease in applying the coating and for accuracy in the distribution thereof, the bulb is desirably blown with a pronounced mold mark 27 lying in an axial plane thereof, which plane is that which defines the edge of the reflecting coating and determines the setting of the major filament 25. This may be effected in any desired manner, as by using a two-piece stationary mold. This mold mark not only visually divides the spherical bulb into two equal portions vertically, to show what part is to be mirrored, but can be used for setting the lead wires and base pins. The filament 25 is also desirably positioned so that its center lies in the plane through the bulb center which is perpendicular to the bulb axis.

The minor filament 22 is desirably disposed in this axis-perpendicular plane, so that, as viewed in Fig. 2, it makes a cross with the major filament, as it also lies in a plane parallel to that of the mold mark, as illustrated. In one embodiment both filaments may be of the same size, of the coil type, and if used in a bulb of the preferred embodiment illustrated, the voltage may be 28 and the candle power 21 for each filament. However, if desired, the minor filament may be straight and the candle power thereof may be much less, or any desired variation may be made within the spirit and scope of the invention.

Although I contemplate leaving the other half of the bulb clear, yet to get greater uniformity of illumination therefrom it is desirable to frost, as indicated at 28, the part or half that is not coated with the reflecting surface.

Referring now to the embodiment of my invention, of which Fig. 4 shows only the mount construction, it is pointed out that the bulb proposed to enclose the mount is desirably identical with the bulb 12 of the first embodiment. The mount of Fig. 4 is a simplification of the mount illustrated in Figs. 1, 2 and 3, in that the press-adjacent portions of the filament supports 18a, 19a and 21a extend parallel to the axis of the bulb and its flare tube 14a with press 20a (rather than extending diagonally, as illustrated most clearly in Fig. 3), until near the filaments when they are bent at right angles.

The support 18a is desirably bent once at right angles to provide the lower or flare-adjacent support for the major filament 25a. The support 19a is desirably bent twice at right angles, as illustrated, to provide the support for one end of the minor filament 22a, while the support 21a is desirably bent four times at right angles, as illustrated, the second section after bending providing the support for the other end of the minor filament 22a and the fourth section after bending providing for the support of the upper or other end of the major filament 25a.

The mount of this figure, therefore, eliminates the separate support wire, designated in Fig. 3 by the reference character 23. It is, thus, a lighter and simplified mount, particularly adapted for machine mounting operations, as distinguished from the hand mount construction of Figs. 1, 2 and 3. It will be understood that the diagrammatic showings to be now described may use a mount of the construction illustrated in Fig. 3 or that of Fig. 4, as desired.

Referring now particularly to Fig. 5, it is there diagrammatically shown how to position the major filament 25 or 25ª, the minor filament 22 or 22ª, and the reflecting surface 26 with respect to the bulb 12. The fact is indicated that the light from the major filament 25 is reflected, in approximately parallel rays from the surface 26, to finally impinge on an article to be illuminated, such as the reticle 29. The light from the minor filament 22, which in the embodiment illustrated is disposed from the major filament 25 two to three millimeters toward the center of the bulb, becomes concentrated to a conjugate focus 31, from whence the same diverges to illuminate the reticle or other object, as may be desired. It will, therefore, be seen that some vibration in concentration and brilliancy may be effected by using one, the other, or both of the filaments 25 and 22, even if they are each of the same candle power.

Fig. 6 is a diagrammatic showing of a similar bulb 12ᵇ, except that the filaments 22ᵇ and 25ᵇ have both been shifted, as by corresponding rotative movement of their supports through a 15° angle, as an example only, and the reflecting coating has been correspondingly modified, so as to direct light on a reticle or other object 29ᵇ on a line 15° below the plane through the center of the bulb and perpendicular to the axis thereof. Such an arrangement would be used if the lamp were in a system in which the beam of light from the illuminated reticle is to be at a corresponding angle, one way or the other, with the plane normal to the axis of the lamp bulb.

Referring now to the diagrammatic optical arrangement illustrated in Fig. 7, there is shown a telescopic or sight tube 32, which may be attached to a gun for sighting the same on a target 33. Said tube desirably contains a neutral sun filter 34 which may be used in the position illustrated, if the tube is sighted against the sun, or moved out of the way by means (not shown) if used on a cloudy or dull day, or in a direction away from the sun. The tube 32 also contains a transparent reflector plate 35, mounted at an angle of 45° with respect to the axis thereof, so that light from a side tube 36, extending in the present embodiment at an angle 90° with respect to the tube 32, is reflected axially of said tube into the eye 37 of the observer.

The side tube 36 is so disposed that its axis intersects the axis of the telescopic tube 32 on the rear or reflecting surface of the plate 35. It contains a projection lens system 38, at the focus of which is disposed a reticle 29, used either with or without a color filter 39, and illuminated from a lamp 11 embodying my invention.

Said lamp 11 desirably has a bayonet-type base 41 comprising a conductive shell 42 connecting with one lead-in conductor and two bottom contacts 43 and 44, respectively connecting with the other lead-in conductors. The lamp may be used with a battery 45, or other source of power, and a rheostat 46 for adjusting the intensity of illumination, a switch 47 serving to energize either one or both of the filaments 22 and 25, as desired. It will also, of course, be understood that the shell 42 serves as the common connection to which the lead-in conductor 17 is attached.

From the foregoing it will be understood that an observer or gunner looking through the telescopic tube 32 sees the target 33 and the bright image of the reticle. The latter may be inscribed with a central dot and concentric circles, cross lines, and/or other means which are focused on the target in order to not only make it possible to aim thereat but also to judge distances.

From the foregoing, it will be seen that I have devised an improved lamp and means for illuminating a gun sight more efficiently than heretofore, thereby overcoming previous difficulties and making it possible to aim a gun even under the most adverse conditions. It will, of course be understood that I contemplate using lamps embodying my invention for many purposes, including sound-recording, sound-reproducing, and motion picture projection. The bulb may be made of ultra-violet transmitting glass, if desired so as to use that component of the generated radiations.

Although preferred embodiments of my invention have been disclosed, it will be understood that modifications may be made within the spirit and scope of the appended claims.

I claim:

1. A reflector lamp comprising a generally spherical bulb with a neck portion extending therefrom, means closing said neck portion and comprising filaments and their lead-in conductors, and a reflecting coating on approximately one-half of said spherical portion, one of said filaments extending generally parallel to the axis of said bulb and disposed approximately halfway between the central portion of said reflecting coating and the axial plane of the bulb which defines the edge of said coating, and the other filament extending approximately at right angles to the plane of the first mentioned filament and bulb axis, and being disposed between said first mentioned filament and the center of said bulb, but as close to the former as is feasible without operating difficulties, whereby the light from said first filament is reflected in substantially parallel rays, while that from said second filament is concentrated to a conjugate focus.

2. A reflector lamp comprising a bulb generally spherical with a neck portion extending therefrom, means forming a mount closing said neck portion and supporting a filament, a reflecting coating over approximately one-half of said spherical portion and frosting on the other half thereof, said filament extending generally parallel to the axis of said bulb and disposed approximately half way between the plane of the dividing line between the reflecting coating and frosting and the central portion of said reflecting coating, so that said coating reflects the light from said filament in approximately parallel rays.

3. A reflector lamp comprising a generally spherical bulb having a neck portion extending therefrom, means forming a mount closing said neck portion and supporting a filament, a mold mark in the axial plane of said bulb dividing the spherical portion in half, and a reflecting coating on the bulb on all of one side of said mold mark, said filament extending generally parallel to the lamp axis and disposed approximately halfway between the plane of said mold mark and the central portion of said reflecting coating so that said coating reflects the light from said filament in approximately parallel rays.

4. A reflector lamp comprising a generally spherical bulb having a diameter of about 1⅛" and a neck portion extending therefrom, means forming a filament-supporting mount closing said neck portion, a reflecting coating on approximately all of the bulb to one side of an axial plane, one mount-supported filament lying generally parallel to the bulb axis and disposed approximately midway between the plane of the edge of said coating and the central portion of said coating, and another mount-supported filament extending at approximately right angles to the plane of said first-mentioned filament and the bulb axis and being disposed from about two to three millimeters from said first filament toward the plane of said coating edge.

5. A reflector lamp comprising a generally spherical bulb with a neck portion extending therefrom, a flare tube, with lead-in conductors, supports and a filament forming a mount, closing said neck portion, and a reflecting coating on approximately all of said spherical portion to one side of an axial plane of said bulb, said filament extending generally parallel to the lamp axis and disposed approximately midway between said axial plane and the central portion of said reflecting coating so that said coating reflects the light from said filament in approximately parallel rays.

6. A reflector lamp comprising a generally spherical bulb with a neck portion extending therefrom, a flare tube, with lead-in conductors, supports and a filament forming a mount, closing said neck portion, and a reflecting coating on approximately all of said spherical portion to one side of a plane set at an acute angle to the axis of said bulb, said filament extending generally parallel to said plane in a plane perpendicular thereto and containing the bulb axis and disposed approximately midway between it and the central portion of said reflecting coating.

7. A reflector lamp comprising a generally spherical bulb having a diameter of about one and one-eighth inches, a neck portion extending therefrom, a flare tube, with lead-in conductors, supports and filaments forming a mount, closing said neck portion, a mold mark in the axial plane of said bulb dividing the spherical portion in half, and a reflecting coating to one side of said mold mark on approximately one-half of said spherical portion and frosting on the other half thereof, one of said filaments extending parallel to the axis and disposed approximately midway between the plane of the mold mark and the central portion of said reflecting coating, the other extending approximately at right angles to the plane of said first-mentioned filament and the bulb axis, and being disposed about two to three millimeters from said first filament toward the plane of said mold mark, whereby the light from said first filament is reflected in substantially parallel rays while that from said second filament is concentrated to a conjugate focus.

8. A reflector lamp comprising a generally spherical bulb with a neck portion extending therefrom, a mount disposed in said neck portion and comprising a flare tube with a press, supports extending from said press, lead-in conductors connecting with the outer ends of said supports and a filament having a straight axis and supported on the inner ends of said supports, said supports extending from said press in such a direction that said filament is disposed with its axis generally parallel to that of said bulb and halfway between the center and a side of the bulb, all of that side of said bulb adjacent said filament having a reflecting coating, so that the coating reflects the light from said filament in approximately parallel rays.

9. A reflector lamp comprising a generally spherical bulb with a neck portion extending therefrom, a mount disposed in said neck portion and comprising a flare tube with a press, supports extending from said press, lead-in conductors connecting with the outer ends of said supports and filaments supported on the inner ends thereof, said supports extending diagonally from said press so that one of said filaments is disposed halfway between the center and side of the bulb and the other close to said first filament, crosswise thereof, and toward the center of said bulb, that portion of said bulb adjacent said first mentioned filament having a specular surface, so that the light from said first mentioned filament is projected in approximately parallel rays and that from the other filament is concentrated to a conjugate focus.

10. A reflector lamp comprising a generally spherical bulb with a neck portion extending therefrom, a mount disposed in said neck portion and comprising a flare tube with a press, three supports extending from said press, lead-in conductors connecting with the outer ends of said supports and a pair of filaments supported on the inner ends thereof, said supports extending from said press first parallel to the bulb axis, one then bent laterally and connected to one end of one filament, another then bent laterally and the free end of said lateral portion bent to extend parallel to said axis and connected to one end of the other filament, and the third then bent and appropriately positioned different portions connected to the other ends of said filaments, so that one of said filaments is disposed halfway between the center and side of the bulb, and the other crosswise thereof and toward the bulb-center, that portion of the bulb adjacent said first-mentioned filament having a specular surface.

11. A reflector lamp comprising a generally spherical bulb with a neck portion extending therefrom, a mount disposed in said neck portion and comprising a flare tube with a press, supports extending from said press, lead-in conductors connecting with the outer ends of said supports and a filament mounted thereon, said supports holding the filament at a distance from the center of the bulb equal to that of half the bulb radius, that portion of said bulb adjacent said filament having a specular surface so that the light from said filament is projected in approximately parallel rays, a third filament support, and another filament mounted in said bulb between said first-mentioned filament and the center and extending between said third and one of the other supports.

12. A reflector lamp comprising a generally spherical bulb with a neck portion extending therefrom, a mount disposed in said neck portion and comprising a flare, a filament, that portion of said bulb adjacent said filament having a specular surface, another filament disposed between said filament and the center of said bulb, supports for one of said filaments extending from said flare, an additional support extending from said flare to one end of the other filament, and a branch support extending from one of said first-mentioned filament supports to the other end of said other filament.

13. A reflector lamp comprising a generally spherical bulb, means positioning a pair of filaments adjacent one side of said bulb, and a reflecting coating on the filament-adjacent side of said bulb, one of said filaments extending generally parallel, and the other at an angle, to the lamp axis, one of said filaments being disposed approximately half-way between the central portion of the reflecting coating and the axis of the lamp, and the other being disposed between said first filament and the center of the bulb, but as close to the former as is feasible without operating difficulties, whereby the light from said first filament is reflected in substantially parallel rays while that from said second filament is concentrated to a conjugate focus.

14. A reflector lamp comprising a generally spherical bulb with a neck portion extending therefrom, a mount disposed in said neck portion and comprising a flare tube with a press, supports extending from said press, lead-in conductors connecting with the outer ends of said supports, and a filament with a straight axis and supported on the inner ends thereof, said supports extending diagonally from said press and holding said filament, with its axis parallel to that of the bulb and neck portion, approximately half-way between the center and a side of the bulb, all of that half of the bulb adjacent and in which said filament is centered having a specular coating that reflects the light from said filament in approximately parallel rays.

15. A reflector lamp comprising a generally spherical bulb with a neck portion extending therefrom, a mount disposed in said neck portion and comprising a flare tube with a press, a plurality of supports extending from said press, lead-in conductors connecting with the outer ends of said supports, and a filament, with a straight axis lying in a plane parallel to that of the bulb and neck portion, supported on the inner ends thereof, said supports extending from said press, first parallel to the bulb axis, and then bent laterally for connection to the respective ends of the filament so that the latter is disposed approximately half-way between the center and a side of the bulb, all of that half of the bulb adjacent and in which said filament is centered having a specular coating that reflects the light from said filament in approximately parallel rays.

JOHN H. KURLANDER.

REFERENCES CITED

The following references are of record in the file of this patent:

UNITED STATES PATENTS

| Number | Name | Date |
|---|---|---|
| 1,616,660 | Henderson | Feb. 8, 1927 |
| 1,705,146 | Willson | Mar. 12, 1929 |
| 1,974,388 | Christmas | Sept. 18, 1934 |
| 1,981,329 | Rivier | Nov. 20, 1934 |
| 1,998,187 | Conti | Apr. 16, 1935 |
| 2,110,590 | Cook, Jr. | Mar. 8, 1938 |
| 2,142,104 | Birdseye | Jan. 3, 1939 |
| 2,144,521 | Bergmans et al. | Jan. 17, 1939 |
| 2,171,571 | Karnes | Sept. 5, 1939 |
| 2,190,569 | Macgill | Feb. 13, 1940 |
| 2,221,629 | Birdseye | Nov. 12, 1940 |
| 2,245,793 | Kurlander | June 17, 1941 |

FOREIGN PATENTS

| Number | Country | Date |
|---|---|---|
| 214,290 | Great Britain | Apr. 9, 1924 |
| 300,937 | Germany | Oct. 1, 1917 |
| 303,844 | Germany | June 12, 1919 |
| 766,557 | France | Apr. 16, 1934 |